United States Patent [19]
Poppe

[11] 4,027,118
[45] May 31, 1977

[54] NETWORK HAVING A TRANSFORMER-COUPLED OPEN-CIRCUIT STABLE NEGATIVE IMPEDANCE AND A SHORT-CIRCUIT STABLE POSITIVE IMPEDANCE

[75] Inventor: Jan Karel August Poppe, Hilversum, Netherlands

[73] Assignee: U.S. Philips Corporation, New York, N.Y.

[22] Filed: Nov. 21, 1975

[21] Appl. No.: 634,258

[30] Foreign Application Priority Data
Oct. 1, 1975 Netherlands ............... 7511542

[52] U.S. Cl. ........................................ 179/170 G
[51] Int. Cl.² .................... H04B 3/16; H04B 3/36
[58] Field of Search ............. 179/170 R, 170 G; 333/80 R, 80 T

[56] References Cited

UNITED STATES PATENTS

| | | | |
|---|---|---|---|
| 2,777,115 | 1/1957 | Linvill | 179/170 G |
| 2,878,325 | 3/1959 | Merrill, Jr. | 179/170 G |
| 3,042,759 | 7/1962 | Bonner | 179/170 G |
| 3,814,866 | 6/1974 | Japenga | 179/170 G |

*Primary Examiner*—Kathleen H. Claffy
*Assistant Examiner*—Randall P. Myers
*Attorney, Agent, or Firm*—Frank R. Trifari; Henry I. Steckler

[57] ABSTRACT

A network has a transformer coupled open-circuit stable negative impedance. A positive impedance is included in the network as a shunt impedance, so as to thereby render the network both open-circuit stable as well as short-circuit stable.

3 Claims, 1 Drawing Figure

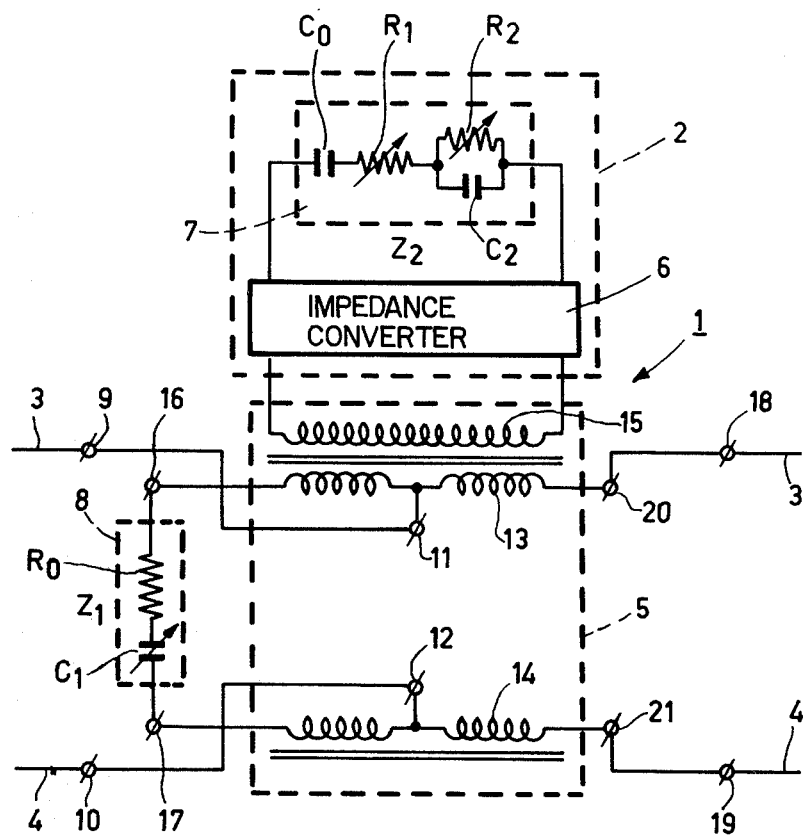

NETWORK HAVING A TRANSFORMER-COUPLED OPEN-CIRCUIT STABLE NEGATIVE IMPEDANCE AND A SHORT-CIRCUIT STABLE POSITIVE IMPEDANCE

The invention relates to a network having a transformer-coupled open-circuit stable negative impedance for two-wire voice-frequency transmission circuits to increase the gain in the voice-frequency band independent of the direction of transmission. A network of the above kind is well-known and in literature it is also called negative impedance amplifier of the open-circuit stable or series type. As the galvanic path through such an amplifier is not interrupted, direct current may flow in one or both transmission lines for signalling purposes or as microphone power supply in subscriber lines during a call. In view of the power supply, such amplifiers are usually placed in a terminal station. As a short circuit is produced at the input terminal of the network during the build-up of the call when such a network is used in a terminal station, efficient operation can only then be obtained if the network is not only open-circuit stable, but also short-circuit stable.

In order to obtain this it is known to provide the network with a short-circuit stable negative impedance which is coupled as negative shunt impedance with the centre taps of the secondary transformer windings which are included in series in the respective lines. This known solution has the drawback that it requires an increase of the number of components and that with low frequency signalling (100 Hz) extra attenuation of the signalling signal is introduced. Furthermore, when counting pulses are transmitted audible noise is produced.

It is an object of this invention to provide an improved network of the type described in the preamble which overcomes the abovementioned drawbacks and which, notwithstanding a saving in required components, enables such an adjustment of the network that, dependent on the cable type and cable length, a maximum permissible amplification can be realized whilst the network stability is fully maintained.

According to the present invention there is provided a network having a transformer coupled open-circuit stable negative impedance for two-wire voice-frequency transmission circuits comprising a postive impedance whose real value is smaller than the real value of said negative impedance, the input terminals of the network being connected to taps of two mutually equal secondary windings of said transformer, whose primary winding is coupled with the negative impedance, said positive impedance being connected, in parallel with the input terminals to those ends of said two mutually equal secondary windings which are located at one side of said taps, the output terminals of the network being connected to those ends of said two mutually equal secondary windings which are located at the other side of said taps.

Owing to the fact that the invention makes use of a shunt impedance which is not negative but positive, an impedance convertor can be omitted. Furthermore, contrary to the negative shunt impedance of the known solution this positive shunt impedance may comprise a capacitor of such a low value that low frequency signalling (100 Hz) is possible without extra attenuation for the signalling signal being introduced.

Furthermore, it appears that saturation phenomena of the transformer which are produced at the transmission of counting pulses and which result in the occurrence of audible noise no longer occur.

The invention and its advantages will be further explained with reference to the FIGURE.

In this sole FIGURE the network is designated generally by reference numeral 1. This network comprises a device 2 which forms a negative impedance which is included in series in the transmission lines 3 and 4 of a two-wire voice-frequency transmission circuit. The transmission lines 3 and 4 preferably are telephone communication lines through which audio information is transmitted and in which the negative impedance is included to increase signal gain in the audio band independent of the direction of transmission.

The device 2 is coupled with both transmission lines 3 and 4 via a transformer 5 for receiving signals from the transmission lines 3 and 4 and passing them on into device 2, which will cause impedance characteristic changes to be fed back into the transmission lines. The device 2 comprises an impedance convertor 6 formed by an operational amplifier as the active element. Impedance convertors in the form of an operational amplifier are well-known. Preferably, such an amplifier has a single output terminal thereof connected back to a non-inverting input terminal via a positive feedback circuit and to an inverting terminal via a negative feedback circuit. To adjust the amount of positive feedback, the positive feedback circuit includes a variable impedance $Z_2$ which is indicated in the FIGURE by reference numeral 7. The net gain achieved is determined by the degree of negative feedback to the inverting input terminal of the amplifier. The negative impedance sensed between this inverting input terminal and a point of fixed potential is coupled in series to the transmission lines 3 and 4 by the coupling transformer 5.

As well known, the negative impedance is open-circuit stable owing to this series coupling.

According to the invention such a network having a transformer-coupled open-circuit stable negative impedance will also be short-circuit stable, if the network 1 further comprises a positive impedance $Z_1$ indicated in the FIGURE by reference numeral 8, whose real value is lower than the real value of the said negative impedance, if the input terminals 9 and 10 of the network 1 are connected to taps 11 and 12 of two mutually equal secondary windings 13 and 14 of said transformer 5, whose primary winding 15 is coupled with the negative impedance, if said positive impedance 8 is connected in parallel with the input terminals 9 and 10 to those ends 16, 17 of said mutually equal secondary windings 13 and 14 which are located on one side of said taps 11 and 12 and if furthermore the output terminals 18 and 19 of the network 1 are connected to those ends 20 and 21 of said mutually equal secondary windings 13 and 14 which are located at the other side of said taps 11 and 12.

In operation, this network divides the open-circuit stable negative impedance in accordance with the transformation ratio of the transformer 5, in a manner such that part of the open-circuit stable negative impedance is connected in series with the input terminals 9 and 10 and the line section connected to the output terminals 18 and 19, whilst another part of the open-circuit stable impedance is connected in series with the positive impedance $Z_1$.

By a proper choice of the impedance networks $Z_1$ and $Z_2$ and a proper rating of $Z_1$ with respect to $Z_2$ the network of the present invention permits the simultaneous adjustment of amplification and circuit stability. For example, the impedance $Z_1$ can be formed, as shown in the FIGURE by the series circuit of a resistor $R_o$ and a variable capacitor $C_1$ and the impedance $Z_2$ can be formed by the series circuit of a capacitor $C_o$, a variable resistor $R_1$ and a variable resistor $R_2$ shunted by a capacitor $C_2$. By means of the adjustment of the capacitors $C_1$ and $C_2$ it is then possible to effect a strong increase of the attenuation for frequencies above the speech band. In this way it is achieved that with a maximum gain at approximately 3400Hz, this gain rapidly changes, above the speech band, into an extra circuit attenuation. Owing to this property the stability above the speech band is greatly enhanced, whilst the additional circuit attenuation for counting pulses transmitted during a call forms no objection anymore above 10KHz. The capacitors $C_1$ and $C_2$ have a specific value for each cable type and can therefore be fixedly adjusted, whilst the resistor $R_o$ and the capacitor $C_o$ remain constant and consequently need not be variable. The amplification is adjusted by means of only two resistors; by means of $R_1$ at 3000Hz and by means of $R_2$ at 1000Hz.

In a practical embodiment in which a network was connected to lines having a core diameter of 0.5 mm and an operational capacitance of approximately 38 nF/km, the above capacitors and resistors had the following values:

$R_o = 180 \Omega$ \} $Z_1$
$C_1 = 62$ nF $C_o = 0.25 \mu F$
$R_1 = 1 - 2.5$ k$\Omega$ \} $Z_2$
$R_2 = 4 - 18$ k$\Omega$
$C_2 = 12.5$ nF at a transformation ratio $n_1 : n_2 = 1:2$ where
$n_1 =$ the winding 13 + 14 and
$n_2 =$ the winding 15.

So, depending on the cable type and circuit length a maximum permissible amplification can be adjusted by means of these impedance networks $Z_1$ and $Z_2$, while maintaining full circuit stability, for use such as:

four-pole terminal repeater: to 5dB at 1000 Hz and 11dB at 3000 Hz;

four-pole intermediate repeater: to 6dB at 1000 Hz and 14dB at 3000 Hz.

What is claimed is:

1. A network for insertion into a two wire transmission line, said network comprising first and second terminal pairs adapted to be coupled to said line, a transformer having a primary winding, two equal secondary windings, each secondary winding having a tap substantially at the center thereof, said taps being adapted to be coupled to said first terminal pair, one end of each of said secondary windings being coupled to said second terminal pair, an open circuit stable negative impedance means coupled to said primary for increasing the gain in a selected frequency band independent of the transmission direction; and means for making said network short circuit stable including a positive impedance means coupled between the remaining ends of said secondary windings and having an absolute real value of impedance lower than the absolute real value of said negative impedance means.

2. A network as claimed in claim 1, wherein said selected frequency band comprises the voice frequency band.

3. A network as claimed in claim 1 wherein said positive impedance means comprises a series resistance capacitance circuit.

* * * * *